United States Patent [19]

Suzuki

[11] Patent Number: 5,612,269
[45] Date of Patent: Mar. 18, 1997

[54] METHOD FOR STABLY RETAINING AN INTERLAYER CROSS-LINKED CLAY UNDER HYDROTHERMAL REACTION AND METHOD FOR PRODUCTION OF A STABLE INTERLAYER CROSS-LINKED

[75] Inventor: Kenzi Suzuki, Aichi-ken, Japan

[73] Assignee: Agency of Industrial Science and Technology, Ministry of International Trade & Industry, Tokyo, Japan

[21] Appl. No.: 521,589

[22] Filed: Aug. 30, 1995

[30] Foreign Application Priority Data

Sep. 13, 1994 [JP] Japan ................................. 6-246851
Sep. 13, 1994 [JP] Japan ................................. 6-246852

[51] Int. Cl.$^6$ ................................................. B01J 29/04
[52] U.S. Cl. ................................. 502/62; 502/80; 502/85
[58] Field of Search ................................. 502/62, 73, 80, 502/85

[56] References Cited

U.S. PATENT DOCUMENTS 5,385,876  1/1995  Schwarz et al. ........................... 502/80

FOREIGN PATENT DOCUMENTS 61-200853  9/1986  Japan ........................................ 502/62

Primary Examiner—Michael Lewis
Assistant Examiner—Thomas G. Dunn, Jr.
Attorney, Agent, or Firm—Oblon, Spivak, McClelland, Maier & Neustadt, P.C.

[57] ABSTRACT

An interlayer cross-linked clay used in a hydrothermal reaction is enabled to remain stable in the hydrothermal treatment by forming a suspension of the interlayer cross-linked clay in combination with an organic compound. The interlayer cross-linked clay used in the hydrothermal reaction under these conditions has carbon deposited on the pillars of the clay and remains stable when it is used in other hydrothermal reactions.

7 Claims, 1 Drawing Sheet

METHOD FOR STABLY RETAINING AN INTERLAYER CROSS-LINKED CLAY UNDER HYDROTHERMAL REACTION AND METHOD FOR PRODUCTION OF A STABLE INTERLAYER CROSS-LINKED

BACKGROUND OF THE INVENTION

1. Field of the Invention

On exposure to harsh conditions, such as under hydrothermal reaction, an interlayer cross-linked clay generally ceases to retain its stability on account of a decrease in the interlayer distance, for example.

This invention relates to a method for stably retaining an interlayer cross-linked clay under a hydrothermal reaction and a method for producing an interlayer cross-linked clay which is stable even under a hydrothermal reaction.

2. Description of the Prior Art

U.S. Pat. Nos. 4,629,713, 4,753,908, 5,084,428, 5,087,598, 5,214,012, and 5,369,069, which cover inventions concerning interlayer cross-linked clay, were issued to inventors including Kenzi Suzuki, the inventor of the instant patent application, and U.S. Pat. No. 4,839,318, also relating to an interlayer cross-linked clay, was issued to the same assignee as that of the instant patent application.

Neither a method for stably retaining an interlayer cross-linked clay under a hydrothermal reaction nor a method for producing an interlayer cross-linked clay which is stably retained even under a hydrothermal reaction has been known in the art.

First, an interlayer cross-linked clay will be described in detail below.

An interlayer cross-linked clay is synthesized by introducing pillars of an inorganic oxide such as alumina or zirconia between layers of the silicate of a clay mineral which possesses a swelling property. The interlayer distance, which is equivalent to pore diameter, equals the size of the pillars and ranges from several to some tens of Ångstroms. Interlayer cross-linked clays resemble zeolites in the size of pore diameter and the chemical properties. Attempts are therefore being made to utilize it for catalysts, catalyst carriers, separating materials, adsorbents, and the like for which zeolites have been commonly used to date. Interlayer cross-linked clays used for these products can be expected to be exposed to various ambient conditions. It may, for example, be used in a cooled or heated state or utilized even under a hydrothermal reaction. Frequently the interlayer cross-linked clay, when left standing at an elevated temperature or in the presence of a hydrothermal reaction, suffers an extreme decrease in surface area or pore volume to the extent of seriously hindering its usefulness.

A strong need is felt for the development of a method which enables an interlayer cross-linked clay of ordinary quality to be retained stably in the presence of a hydrothermal reaction and a special interlayer cross-linked clay which is capable of being stably retained under the presence of a hydrothermal reaction.

The present inventor continued a study with a view to meeting this need and has perfected this invention as a result.

SUMMARY OF THE INVENTION

An interlayer cross-linked clay can be stably retained under an hydrothermal reaction by mixing the interlayer cross-linked clay with water and an organic compound capable of being carbonized by a hydrothermal reaction thereby giving birth to a suspension and consequently allowing the interlayer cross-linked clay to exist ultimately in the form of the suspension.

An interlayer cross-linked clay having carbon attached to the surface thereof can be obtained by preparing a suspension which contains an interlayer cross-linked clay and an organic compound as essential main components thereof, subjecting this suspension to a hydrothermal treatment, filtering the resultant treated liquid, and drying the residue of the filtration. This interlayer cross-linked clay which has carbon attached to the surface thereof is stable enough to remain substantially intact even when it is exposed to a hydrothermal treatment.

DESCRIPTION OF THE PREFERRED EMBODIMENTS

Figure 1:
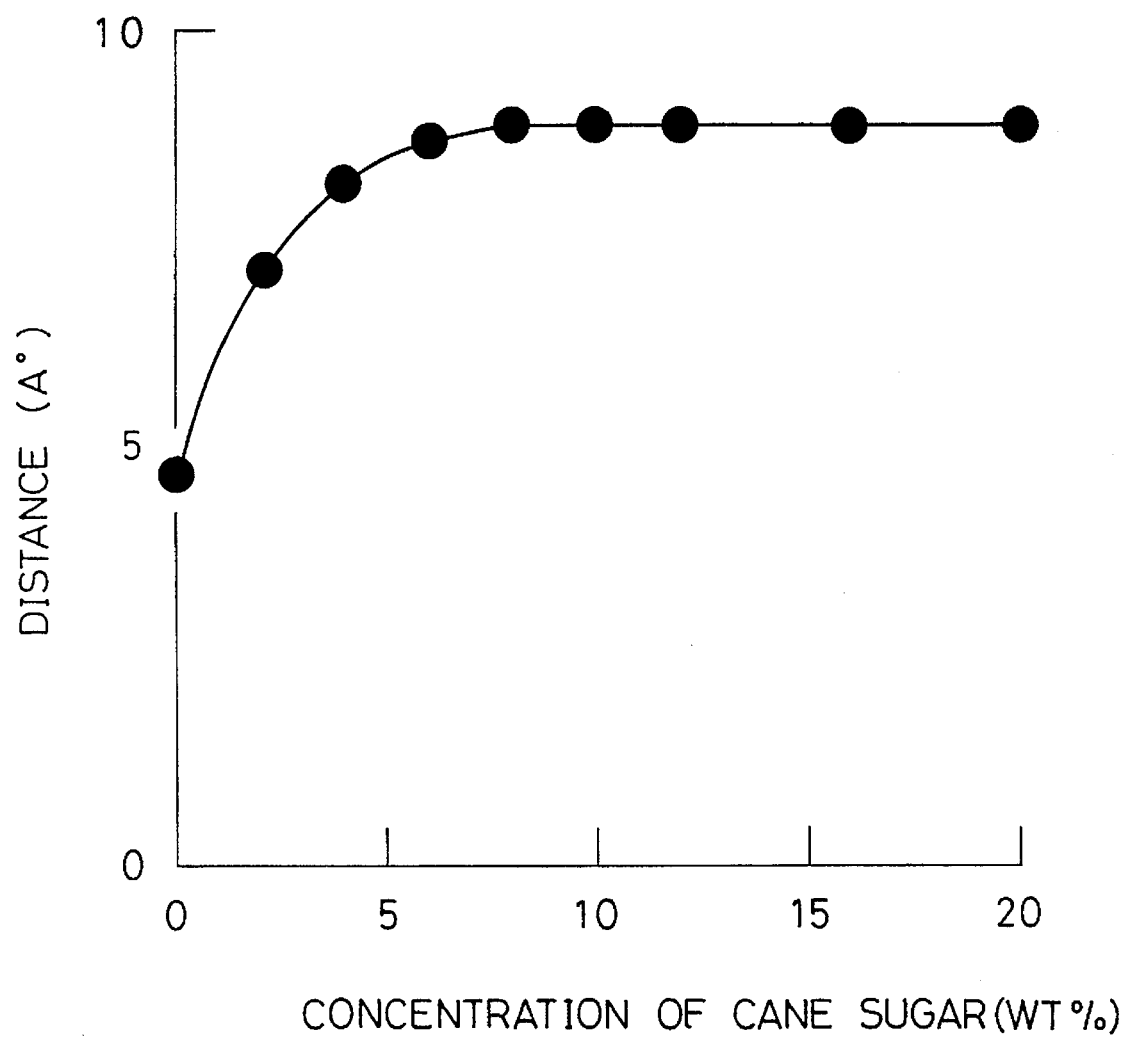
FIG. 1 shows the relation between the concentrations of cane sugar in the suspensions used severally in the hydrothermal reactions of Comparative Example 1 and Examples 1 through 8 and the distances separating the alumina cross-linked montmorillonite layers recovered consequently to the hydrothermal reaction.

The interlayer cross-linked clay to be used in the present invention will be described in detail below. For the clay mineral as the matric material thereof, a species of smectite which possesses a cation-exchange ability and a swelling property is chiefly used. Smectite embraces numerous such clay minerals as montmorillonite and hectorite. Montmorillonite, which is one of these clay minerals, occurs in a form having numerous silicate layers superposed one upon another. The silicate layers comprise a three-layer structure which consists of an octahedral layer of alumina and two tetrahedral layers of silica superposed one each on the opposite sides of the octahedral layer of alumina. Since part of the $Al^{3+}$ which forms the center metal ion of the alumina octahedron is isomorphously substituted as by the $Mg^{2+}$ which has a small charge quantity, the silicate layer is deficient in electric charge. Further, part of the $Si^{4+}$ which forms the center metal ion of the silica tetrahydron is isomorphously substituted by such a cation as the $Al^{3+}$ which has a small charge quantity. The silicate layer assumes a negative charge because of the occurrence of isomorphous substitution between cations differing in electric charge. Generally, the cation-exchange capacity is determined by the degree of isomorphous substitution. To be specific, a smectite which has a large capacity for isomorphous substitution has a large cation-exchange capacity and a smectite which has a small capacity for isomorphous substitution has a small cation-exchange capacity. The superposed silicate layers contain therebetween a cation such as $Na^+$ or $Ca^{2+}$ for canceling their negative charge. The cation can be exchanged for other cation.

The interlayer cross-linked clay is synthesized by introducing a pillar precursor between the superposed silicate layers of a smectite which has been suspended in and swelled with water. Since the cation-exchange property of a clay mineral is utilized for the synthesis, the pillar precursor is required to possess a cationic property. Various cationic inorganic oligomers are known to be capable of serving as the pillar precursor. For example, $[Al_{13}O_4(OH)_{24}(H_2O)_{12}]^{7+}$ is used where the pillar is alumina [G. Johansson, Acta Chem. Scand., Vol. 14, p. 771 (1960)] and $[Zr_4(OH)_{14}(H_2O)_{10}]^{2+}$ is used where the pillar is zirconia [S. Yamanaka and G. W. Brindley, Clays Clay Miner., Vol. 27, p. 119 (1979)]. After the cation has been introduced between the superposed silicate layers by means of ion exchange and fixed therein, it undergoes gradual hydrolysis and ultimate conversion into a hydroxide. By the subsequent treatments such as washing with water, drying, and heating, the synthesis of an interlayer cross-linked clay possessing pillars of the oxide such as alumina or zirconia is completed. Though the distance between the adjacent component layers of the interlayer cross-linked clay and the specific surface area of the clay vary somewhat with the method of synthesis, the distance is in the neighborhood of 8 Ångstroms and the specific surface area is in the range of from 300 to 500 $m^2/g$.

This invention relates to a general method for allowing the distance between the adjacent component layers of the interlayer cross-linked clay normally approximating 8 Ångstroms to remain practically intact under a hydrothermal reaction and to a method for producing a specific interlayer cross-linked clay such that the distance between the adjacent component layers thereof is retained practically intact even under a hydrothermal reaction.

The former method will be described first.

When an interlayer cross-linked clay is used for a hydrothermal reaction, the coexistence of this interlayer cross-linked clay with an organic compound enables the clay to remain stable in the course of the reaction with the distance between the adjacent component layers of the clay kept either unchanged or changed only slightly.

In this case, the interlayer cross-linked clay is used in the form of a suspension containing the organic compound in the hydrothermal reaction.

The practical conditions under which the method described above is smoothly implemented will be explained below.

The hydrothermal reaction proceeds advantageously at a temperature in the range of from 100° C. to 300° C. under a pressure in the range of from 1 $kgf/cm^2$ to 85 $kgf/cm^2$. If the temperature is less than 100° C. or the pressure is less than 1 $kgf/cm^2$, the reaction will be no longer hydrothermal and the presence of the organic compound will be no longer necessary. If the temperature exceeds 300° C. or the pressure exceeds 85 $kgf/cm^2$, the clay will undergo a change in structure.

Concrete examples of the organic compound preferably used for the hydrothermal reaction include saccharides and derivatives thereof, amino acids and derivatives thereof, proteins, and hydrophilic organic polymers.

Among these organic compounds, cane sugar proves particularly appropriate from the practical point of view.

In the suspension containing an interlayer cross-linked clay and an organic compound and used for the hydrothermal reaction, it is advantageous from the practical point of view to fix the concentration of the interlayer cross-linked clay concentration in the range of from 0.1 to 5 g/10 ml and that of the organic compound in the range of from 0.1 to 2 g/10 m.

Concrete examples of the interlayer cross-linked clay used preferably from the practical point of view in the suspension for the hydrothermal reaction include the species of montmorillonite and hectorite which have pillars of alumina and zirconia.

The method under discussion will now be described specifically with respect to alumina cross-linked montmorillonite adopted as an interlayer cross-linked clay. Alumina cross-linked montmorillonite is an interlayer cross-linked clay having montmorillonite as a matric clay mineral and using alumina for pillars. The distance between the adjacent component layers of the alumina cross-linked montmorillonite is 8.2 Ångstroms prior to the hydrothermal treatment and is 4.7 Ångstroms subsequently to the hydrothermal treatment. When the alumina cross-linked montmorillonite is exposed in combination with an organic compound to a hydrothermal treatment in accordance with this invention, the distance between the adjacent component layers thereof is retained intact. The organic compound is carbonized by the hydrothermal treatment and the resultant carbon is adsorbed on the surface of the pillars. As a result, the pillars are isolated from the hydrothermal reaction environment. Practically no change, therefore, occurs in the distance between the adjacent component layers of the clay. When a hydrophilic polymer is adopted as the organic compound, it must possess a size appropriate for its insertion into the gaps intervening between the adjacent component layers of the clay.

The latter method concerns the production of an interlayer cross-linked clay which is stable even under a hydrothermal reaction.

An interlayer cross-linked clay which has been exposed to the treatment in accordance with the former method is enabled to remain stable in the course of the hydrothermal treatment because of the adsorption of carbon to the pillars as described above. When the interlayer cross-linked clay having carbon attached to the pillars thereof is separated from the reaction solution, an interlayer cross-linked clay which is stable even under a hydrothermal reaction can be obtained. This method will be described below by way of example. It starts with the preparation of a suspension of an interlayer cross-linked clay and an organic compound in water as a solvent. The suspension thus prepared is subjected to a hydrothermal treatment by the use of an autoclave. It is important for the conditions selected for this treatment to be capable of carbonizing the organic compound. The example is depicted on the assumption that the hydrothermal treatment is carried out at a temperature of 180° C. for a period of 24 hours. This hydrothermal treatment may be performed similarly under other conditions so long as they likewise induce the carbonization of the organic compound. If the temperature of the hydrothermal treatment is unduly high, the clay will sustain a change in structure. When smectite is adopted as the clay, for example, it is proper to keep the temperature of the hydrothermal treatment below 300° C. When the product of the hydrothermal treatment is washed with water, dried, and then recovered, an interlayer cross-linked clay having carbon attached as contemplated by this invention is consequently obtained. The carbonization of the organic compound can be implemented not only by the method which utilizes a hydrothermal treatment but also by any other means capable of carbonizing the organic compound.

The conditions involved in the operation up to the hydrothermal treatment mentioned above are identical to those of the method for stably retaining an interlayer cross-linked clay under a hydrothermal reaction. The conditions of the hydrothermal reaction, the kind of organic compound, the composition of the suspension, and the like, therefore, are identical to those involved in the method mentioned above.

The amount of carbon attached to the pillars is preferably not less than 2 mg per g of the interlayer cross-linked clay from the practical point of view.

This invention will now be described with reference to working examples and comparative examples.

(Production of alumina cross-linked montmorillonite)

A suspension was prepared by combining 200 ml of distilled water with 20 g of Na-montmorillonite and thoroughly mixing them by stirring. Then, with the suspension kept stirred, 100 ml of an aqueous 10 wt % $Al_2(OH)_5Cl.2.4H_2O$ solution was added piecemeal thereto. After the addition, the resultant mixture was left standing at normal room temperature for five days. The clay obtained by filtering the mixture was washed with water, dried at 60° C., and then held at 500° C. for one hour to complete synthesis of alumina cross-linked montmorillonite. The distance between the adjacent component layers in the synthesized alumina cross-linked montmorillonite was 8.2 Ångstroms.

(Stability of interlayer cross-linked clay in the presence of hydrothermal reaction)

The alumina cross-linked montmorillonite mentioned above was subjected to a hydrothermal treatment in the presence of cane sugar used in a varying concentration as an organic compound. The results of this treatment are dealt with in comparative examples and working examples set out hereinbelow. The hydrothermal treatment was carried out by placing 10 ml of the suspension of alumina cross-linked montmorillonite in a vessel of Teflon (tetrafluoroethylene resin) having an inner volume of 30 ml, tightly sealing the suspension in the vessel, and treating it at a temperature of 180° C. under a pressure of 10 kgf/cm² for 24 hours.

The distance between the adjacent component layers of the clay was determined by subjecting the alumina cross-linked montmorillonite recovered after completion of the hydrothermal treatment to powder X-ray diffraction analysis. This distance was obtained by subtracting the thickness, 9.6 Ångstroms, of one silicate layer from the magnitude, d (001), obtained by the powder X-ray diffraction.

COMPARATIVE EXAMPLE 1

A suspension was prepared by thoroughly stirring 0.50 g of alumina cross-linked montmorillonite with 10 ml of distilled water added thereto. After completion of the hydrothermal treatment, the treated alumina cross-linked montmorillonite species was recovered from the product of the treatment and dried at 60° C. The distance of the adjacent component layers of this species was found to be 4.7 Ångstroms, indicating a decrease of 3.5 Ångstroms.

EXAMPLES 1 THROUGH 8

Suspensions were prepared by thoroughly stirring 0.5 g of alumina cross-linked montmorillonite severally with 10-ml aqueous solutions containing cane sugar in concentrations of 2, 4, 6, 8, 10, 12, 16, and 20 wt %. After completion of the hydrothermal treatment, the treated alumina cross-linked montmorillonite species were recovered from the products of the treatment and dried at 60° C. The distances between the adjacent component layers of these species were found to be 7.2, 8.2, 8.7, 8.9, 8.9, 8.9, 8.9, and 8.9 Ångstroms, respectively. The relations between the concentrations of cane sugar and the interlayer distances of the treated alumina cross-linked montmorillonite species recovered from the products of the treatment in the comparative example and the working examples cited above are shown in FIG. 1.

The effect of this invention is evident from the comparative example and the working examples.

The treated alumina cross-linked montmorillonite species recovered from the products of the hydrothermal treatment and dried in Examples 1 through 8 exhibited signs of adsorption of carbon on pillars.

(Production of cross-linked montmorillonite stable under a hydrothermal reaction and results of hydrothermal reaction performed on the produced cross-linked montmorillonite)

EXAMPLES 9 THROUGH 16

In exactly the same manner as in Examples 1 through 8, treated alumina cross-linked montmorillonite species having carbon attached to the pillars thereof were produced. The amounts of carbon so attached were found to be 2, 4, 6, 8, 10, 12, 16, and 20 mg respectively per g of the relevant treated alumina cross-linked montmorillonite species. Then, a 10-ml suspension of each of the carbon-deposited alumina cross-linked montmorillonite species and distilled water was placed in a vessel of Teflon (tetrafluoroethylene resin) having an inner volume of 30 ml, sealed tightly therein, and subjected to a hydrothermal treatment at a temperature of 180° C. for a period of 24 hours.

The amounts of the carbon-deposited alumina cross-linked montmorillonite species added to relevant 10-ml suspensions in distilled water were 0.51 g, 0.56 g, 0.62 g, 0.71 g, 0.82 g, 0.90 g, 1.07 g, and 1.27 g, respectively. The interlayer distances in the treated species resulting from the hydrothermal treatment were found to be 6.5, 7.4, 8.4, 8.5, 8.6, 8.8, 8.8, and 8.9 Ångstroms.

The interlayer distances in the carbon-deposited alumina cross-linked montmorillonite species prior to the hydrothermal treatment were 7.2, 8.2, 8.7, 8.9, 8.9, 8.9, 8.9, and 8.9 Ångstroms respectively. Comparison of the two sets of magnitudes indicates that the hydrothermal treatment produced virtually no change in the interlayer distances.

COMPARATIVE EXAMPLE 2

A suspension was prepared by adding 10 ml of distilled water to 0.50 g of alumina cross-linked montmorillonite possessing an interlayer distance of 8.2 Ångstroms and having no deposited carbon. After this suspension was subjected to a hydrothermal treatment, the interlayer distance of the alumina cross-linked montmorillonite was found to be 4.7 Ångstroms, a value indicating a decrease of 3.5 Ångstroms in the interlayer distance due to the hydrothermal treatment.

Examples 9 through 16 and Comparative Example 2 demonstrate that the carbon-deposited interlayer cross-linked clays incur virtually no change in interlayer distance even when they are exposed to a hydrothermal reaction.

What is claimed is:

1. A method for producing an interlayer cross-linked clay having carbon attached to the surface thereof and exhibiting stability under a hydrothermal treatment, which method comprises preparing a suspension having an interlayer cross-linked clay and an organic compound capable of being carbonized by a hydrothermal treatment as essential main components thereof, subjecting said suspension to a hydrothermal treatment under conditions effective to carbonize said organic compound, filtrating the resultant product of said treatment, and drying the residue of filtration.

2. The method according to claim 1, wherein said hydrothermal reaction is carried out at a temperature in the range of from 100° C. to 300° C. under a vapor pressure in the range of from 1 kgf/cm² to 85 kgf/cm².

3. The method according to claim 1, wherein said organic compound is at least one member selected from the group consisting of saccharides and derivatives thereof, amino acids and derivatives thereof, proteins, and hydrophilic organic polymers.

4. The method according to claim 3, wherein said organic compound is cane sugar.

5. The method according to claim 1, wherein the clay forming said interlayer cross-linked clay is at least one member selected from the group consisting of montmorillonite and hectorite.

6. The method according to claim 1, wherein said suspension contains said interlayer cross-linked clay at a concentration in the range of from 0.1 g/10 ml to 5 g/10 ml and said organic compound at a concentration in the range of from 0.1 g/10 ml to 2 g/10 ml.

7. The method according to claim 1, wherein the amount of carbon deposited is at least 2 mg per g of said interlayer cross-linked clay.

* * * * *